United States Patent [19]
Inoue et al.

[11] Patent Number: 5,342,526
[45] Date of Patent: Aug. 30, 1994

[54] EXTRACTION AGENT FOR PALLADIUM AND PLATINUM AND PROCESS OF EXTRACTING SAME

[75] Inventors: Katsutoshi Inoue; Kazuharu Yoshizuka, both of Saga; Yoshinari Baba, Fukuoka; Masato Tazaki, Kumamoto, all of Japan

[73] Assignee: Tanaka Kikinzoku Kogyo K.K., Japan

[21] Appl. No.: 975,268

[22] Filed: Nov. 12, 1992

[51] Int. Cl.$^5$ .............................................. B01D 11/04
[52] U.S. Cl. .................................... 210/634; 210/638
[58] Field of Search ....................... 210/634, 638, 511; 423/22

[56] References Cited
U.S. PATENT DOCUMENTS
5,045,290  9/1991  Harris et al. ........................... 423/22

Primary Examiner—Frank Spear
Attorney, Agent, or Firm—Klauber & Jackson

[57] ABSTRACT

Disclosed herein are an extracting agent for precious metal having the below foretold and a process of extracting precious metals employing the said extracting agent from a hydrochloric acid solution containing the precious metals. Further, by controlling the concentration of the hydrochloric acid solution and the extraction time, the separation of the metals can be performed.

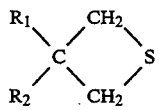

3 Claims, 1 Drawing Sheet

EXTRACTION AGENT FOR PALLADIUM AND PLATINUM AND PROCESS OF EXTRACTING SAME

BACKGROUND OF THE INVENTION

This invention relates to an extraction agent employed for solvent extraction of palladium and platinum and a process of recovering these precious metals by extracting and back-extracting same by means of the extraction agent.

A variety of substances have been conventionally reported which are employed for recovering palladium and platinum as a solvent extraction agent.

Trioctyl phosphine oxide (TOPO), methyl isobutyl ketone (MIBI), tributyl phosphate (TBP) and trioctylamine are known as an extraction agent of palladium and platinum from a hydrochloric acid solution, and diethyldithiocarbamic acid is known as a chelate extraction agent.

These agents possess such disadvantages as poor selectivity of recovering only precious metals, insufficient extraction efficiency, slow extraction speed and difficulty of back-extraction after extraction to an organic phase.

In accordance with a concept of "hard acid, soft acid and hard base, soft base" proposed by Mr. R. G. Pearson (reference is made to J. Amer. Chem. Soc. 3533 (1963)), palladium and platinum are typically classified in soft acids.

Accordingly, in order to selectively extract these metals, a sulfur compound which is classified in soft bases is preferably employed as an extraction agent.

Dihexyl sulfide and dioctyl sulfides which are synthetically prepared and petroleum sulfides contained in crude oil are known as the above sulfur compound, and are employed in practical processes.

In case of employing these extraction agents, however, the extraction of palladium and platinum requires a long period of time such that several hours are required to attain the equilibrium in case of the palladium and extraction of tetravalent platinum can be seldom performed in a period of practicable hours.

SUMMARY OF THE INVENTION

The present invention has been made to overcome the above drawbacks.

Accordingly, an object of the present invention is to provide a process and an extraction agent of selectively extracting palladium and platinum from a hydrochloric acid aqueous solution having a wide range of concentrations.

Another object of the invention is to provide the process and the extraction agent capable of extracting the precious metal at a high extraction speed.

A further object of the invention is to provide the process and the extraction agent having a high back-extraction efficiency.

As a result of the researches of the present inventors, it has been found that the dialkyl thiethanes having a following structure can extract tetravalent platinum as well as palladium in a relatively short period of time.

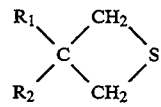

In this formula, $R_1$ and $R_2$ designate the same or different alkyl groups having a straight or branched carbon chain such as methyl, ethyl, n-propyl, iso-propyl, n-butyl, iso-butyl, sec-butyl, n-pentyl and n-hexyl.

The above dialkyl thiethanes may be employed either as a single substance or a mixture thereof.

The dialkyl thiethane according to the present invention can be applied to a process of extracting palladium and platinum.

The process and the extraction agent according to the present invention are epoch-making since they enables the nearly complete extraction of the precious metals and the separation therebetween.

DETAILED DESCRIPTION OF THE INVENTION

Figure 1:
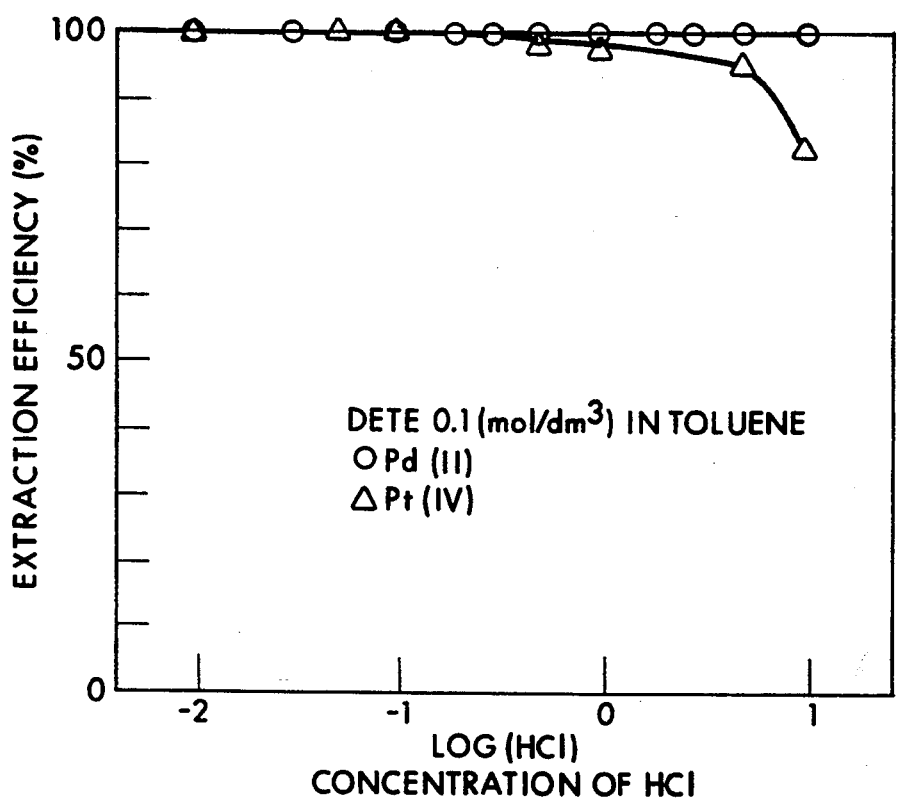
FIG. 1 is a graph showing the relation between a hydrochloric acid concentration and an extraction efficiency when palladium and platinum are extracted from the hydrochloric acid aqueous solution in Example 3.

According to the process of this invention, palladium and platinum having a high purity can be effectively recovered in a relatively short period of time from a hydrochloric acid aqueous solution containing palladium and platinum employing a solvent extraction method.

Since the extraction agent to be employed selectively extracts palladium and platinum in a wide range of hydrochloric acid concentrations, the above precious metal can be selectively recovered at a high yield from an aqueous solution containing the precious metal and another metal.

Generally, in case that the extraction performance of an extraction agent is excellent, the back-extraction is usually difficult.

In case of tile process employing the extraction agent of the present invention, the palladium and the platinum can be back-extracted employing such a particular back-extraction agent as ammonia, thiourea and ammonium thiocyanate.

The palladium and the platinum in the aqueous solution back-extracted can be converted into a metal having substantially no impurities.

Employing the back-extraction agent of the present invention enables the recovery of palladium, platinum and the like from a hydrochloric acid solution having a wide range of concentration from 0.01 to 10 normals and containing the palladium and the platinum. Further, the separation of the palladium, the platinum and the like may be performed by controlling the hydrochloric acid concentration and conducting the extraction in a short period of time.

EXAMPLE

Although Examples of the present invention will be described, these Examples do not restrict the present invention.

Example 1

The same volumes of a toluene solution containing 3,3-diethylthiethane (in the general formula already mentioned, $R1=R2=CH_3-CH_2-$, hereinafter referred to as DETE) and of a 1N hydrochloric acid solution containing palladium (II) having a concentration of $1.03 \times 10^{-2}$ mol/dm$^3$ were taken and the extraction of the palladium was conducted in a thermostat at 30° C. under shaking. The palladium concentration in the hydrochloric acid solution was measured employing the atomic absorption method to obtain the results shown in Table I.

TABLE I

| Shaking Time (hour) | Pd Concentration in HCl Solution (mol/dm$^3$) | Extraction Efficiency (%) |
|---|---|---|
| 0.5 | $4.31 \times 10^{-4}$ | 58.02 |
| 1 | $1.76 \times 10^{-4}$ | 82.84 |
| 2 | $1.31 \times 10^{-5}$ | 98.73 |
| 4 | $2.75 \times 10^{-6}$ | 99.73 |
| 8 | $1.15 \times 10^{-6}$ | 99.89 |
| 12 | $1.13 \times 10^{-6}$ | 99.89 |
| 16 | $1.11 \times 10^{-6}$ | 99.89 |
| 24 | $7.47 \times 10^{-7}$ | 99.93 |
| 48 | $7.39 \times 10^{-7}$ | 99.93 |

From the results shown above, the extraction efficiency of 99.9% was obtained after the 8 hours' shaking.

Example 2

The palladium concentrations in the hydrochloric acid aqueous solutions were measured employing the atomic absorption method to obtain the results shown in a following Table 2 after the same procedures as those of Example 1 were conducted employing the hydrochloric acid aqueous solutions having various concentrations and containing palladium. The shaking was continued for 10 hours.

TABLE 2

| HCl (mol/dm$^3$) | Initial Concentration of Pd (mol/dm$^3$) | Extraction Efficiency (%) |
|---|---|---|
| 0.01 | $8.88 \times 10^{-4}$ | 100 |
| 0.03 | $8.49 \times 10^{-4}$ | 100 |
| 0.1 | $9.25 \times 10^{-5}$ | 100 |
| 0.2 | $7.28 \times 10^{-4}$ | 100 |
| 0.3 | $7.73 \times 10^{-4}$ | 100 |
| 0.5 | $9.31 \times 10^{-4}$ | 100 |
| 1.0 | $7.69 \times 10^{-3}$ | 100 |
| 2.0 | $1.18 \times 10^{-3}$ | 100 |
| 3.0 | $7.92 \times 10^{-4}$ | 100 |
| 5.0 | $7.36 \times 10^{-4}$ | 100 |
| 10.0 | $9.13 \times 10^{-4}$ | 100 |

It is found from the above results that the extraction is not affected by the change of the hydrochloric acid concentration.

Example 3

The extraction efficiencies were measured by shaking for 24 hours a hydrochloric acid solution containing palladium and platinum and a toluene solution containing DETE of 0.1 mol/dm$^3$ in the volume ratio of 1:1 while the concentration of the hydrochloric acid was changed in the range of 0.01 normal to 10 normals. As shown in FIG. 1, the palladium could be extracted at the extraction efficiency of 100% in the entire range of the hydrochloric acid concentration, and the platinum could be also extracted at the extraction efficiency of 100% in the range of 0.01 to 0.1 normal and at the extraction efficiency of 85% at 10 normals.

Figure 2:
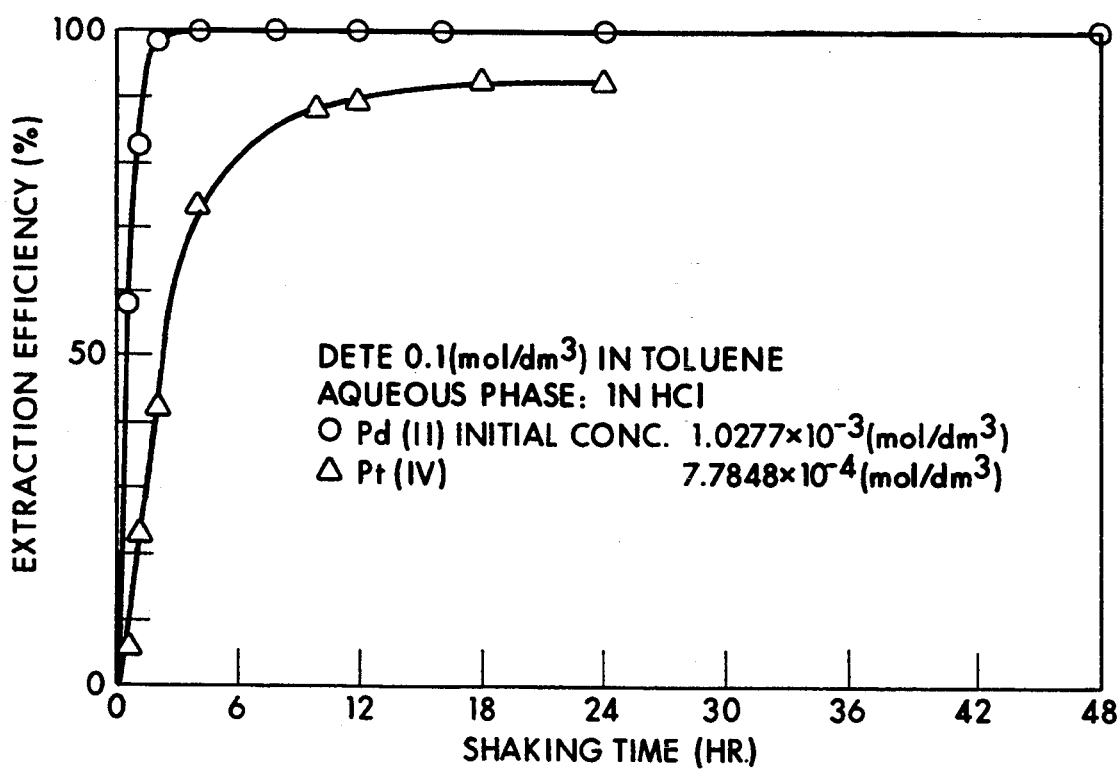
FIG. 2 is a graph showing the relation between an extraction efficiency of palladium and platinum and a shaking time in Example 3.

Then, the extraction speed was measured at the hydrochloric acid concentration of 1 normal while the shaking time was changed. As shown in FIG. 2, 100% of the palladium could be extracted in a period of over 2 hours while 85% of the platinum could be extracted in a period of over 18 hours.

Judging from the results, the simultaneous complete extraction of the palladium and the platinum may be made possible by controlling the hydrochloric acid concentration around 1 normal. The separation between the palladium and the platinum may be made possible by controlling the hydrochloric acid concentration not less than 1 normal and conducting the extraction in a short period of time.

Example 4

Each 50 ml of a 1N hydrochloric acid solution containing palladium of $1.03 \times 10^{-3}$ mol/dm$^3$ and of a toluene solution containing DETE of 0.1 mol/dm$^3$ were shaken to extract the palladium. The DETE solution containing the extracted palladium was divided into 4 samples of a 10 ml solution. As back-extraction agents, aqueous ammonia, a thiourea solution and a ammonium thiocyanate solution were prepared. After each of the above samples was mixed with each of the back-extraction agents and shaken overnight, the palladium concentration was measured by means of tile atomic absorption method to calculate the back-extraction efficiencies. The results are shown in the below Table 3.

TABLE 3

| Back-Extraction Agent and its Concentration | Pd Concentration in Back-Extraction Agent Solution (mol/dm$^3$) | Back-Extraction Efficiency (%) |
|---|---|---|
| Ammonia, 2 mol/dm$^3$ | $9.78 \times 10^{-4}$ | 95.18 |
| Thiourea, 1 mol/dm$^3$ | $9.51 \times 10^{-4}$ | 92.56 |
| Ammonium Thiocyanate 1 mol/dm$^3$ | $9.32 \times 10^{-4}$ | 90.65 |
| Ammonium Thiocyanate 2 mol/dm$^3$ | $9.63 \times 10^{-4}$ | 93.74 |

It has been found that the high back-extraction efficiencies could be attained when the aqueous solutions of the ammonia, the thiourea and the ammonium thiocyanate were employed as the back-extraction agents.

What is claimed is:

1. A method for recovering palladium and/or platinum from a solution containing palladium and/or platinum, comprising the step of extracting the palladium and/or platinum with an extraction agent for the palladium and/or platinum, comprising a material having a following general formula (wherein R1 and R2 designate alkyl groups having a straight chain or a side chain consisting of 1 to 6 carbon atoms)

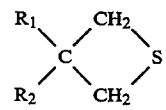

2. A process of recovering palladium and/or platinum which comprises contacting an extraction solvent containing dialkyl thiethane having a following general formula (wherein R1 and R2 designate alkyl groups having a straight chain or a side chain consisting of 1 to 6 carbon atoms) as an extraction agent with a hydrochloric acid aqueous solution containing the palladium and/or platinum and extracting the palladium and/or platinum into the extraction solvent.

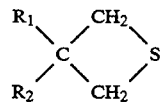

3. A process as claimed in Claim 2, wherein the palladium and/or platinum extracted into the extraction solvent is back-extracted into an aqueous solution selected from the group consisting of aqueous ammonia, a thiourea aqueous solution and an ammonium thiocyanate aqueous solution to obtain the aqueous solution containing the palladium and/or platinum.

* * * * *